Nov. 29, 1932.　　J. HOLLINS ET AL　　1,889,551
SIGNAL LIGHT CONTROL
Filed Jan. 25, 1929

INVENTORS
Jesse Hollins,
BY Abraham Hollins
David J. Moscovitz
ATTORNEY

Patented Nov. 29, 1932

1,889,551

UNITED STATES PATENT OFFICE

JESSE HOLLINS AND ABRAHAM HOLLINS, OF BROOKLYN, NEW YORK

SIGNAL LIGHT CONTROL

Application filed January 25, 1929. Serial No. 334,957.

Our invention relates to improvements in electric signalling means, and more particularly to a signalling system suitable for use with motor vehicles.

The present invention contemplates the provision of signal lights either at the front or at the rear of a vehicle or on both such places, which may be selectively operated to indicate to an observer, the intention of the driver of the vehicle, i. e., to inform such observer that the vehicle will make a turn, to the left or to the right.

The present invention also has for its object to provide a signalling system which may be manually set into operation at any desired moment, in advance of that at which the turn is to be made, so as to give sufficient and proper warning to an observer.

It is a further object of the invention to control different lamps, which are differently colored, or have different indicia thereon, through central circuits, having selectively manually operable switches therein. To this end, each of such circuits, is provided with a spring pressed switch, which is momentarily operated to close an electric circuit, including the coil of an electromagnet, which is in series with one or more of the signal lights, the electromagnet thereupon attracts an armature, thereby closing a secondary circuit through such armature, the coil of the electromagnet, the winding of the coil and the lamps, and one or more of the signalling means. This secondary circuit continues to feed current to the signalling lamps until the circuit is broken automatically, upon operation of the steering gear.

It is a still further object of the invention, to provide pilot lights, which are in parallel with the respective signalling lights, and are located within view of the driver and serve to notify him which of the signal lights is in operation, so that if an error has been made, the same can be corrected before the turn is begun.

Our invention also contemplates the provision of mechanism of the above indicated character, which is simple in construction and positive in its operation, and can be manufactured at a low cost.

Other objects and advantages will be clear from the following description taken in connection with the accompanying drawing, and the features of novelty will be pointed out in the appended claims, in said drawing.

Figure 1:
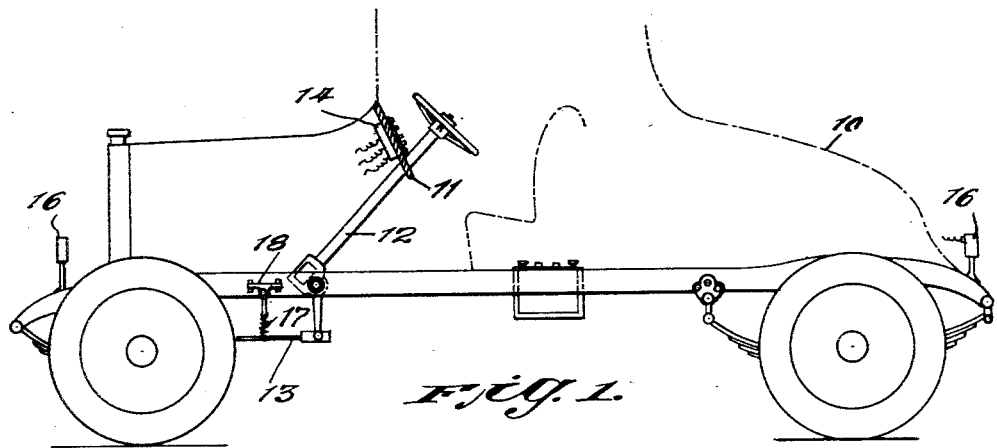
Figure 1 is a side elevation of a motor vehicle, showing only those parts thereof, which are necessary for an understanding of my invention.

Figure 1 shows a motor vehicle, of any suitable construction, having a dash board 11, a steering gear including a steering post 12, and an arm 13. Upon the dash board 11, is mounted a switch box 14, which will be described more in detail hereinbelow.

Upon both sides of the vehicle and preferably at both the front and the rear thereof, are mounted lamps 15 and 16; these lamps are differently colored or have suitable indicia thereon, to indicate to an observer when one of them is lighted, in which direction the vehicle is about to be turned.

Attached to the arm 13, preferably through a spring 17, is a switch 18, which is adapted to remain normally in a closed position, but is opened upon operation of the steering gear for either a right or a left turn.

Figure 2:
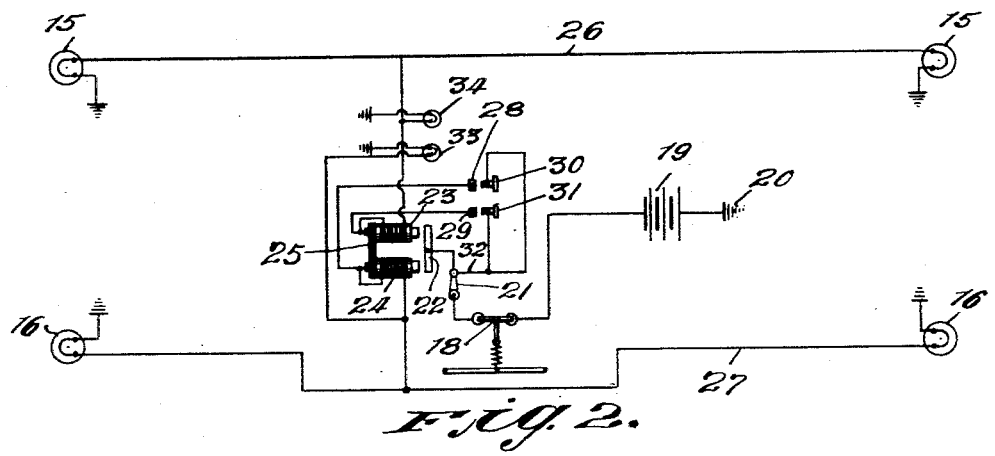
Figure 2 illustrates the wiring diagram of my improved signalling system.

Referring now to Figure 2, it will be seen that the switch 18, is in series with a battery 19, which may be the battery with which motor vehicles are usually provided, and which is grounded at 20, to the frame of the vehicle. The switch 18, is in series with a manually operable switch 21, and with an armature 22, pivoted intermediate its ends. This armature is adapted to cooperate with the fixed cores of a pair of electromagnets 23 and 24, which are mounted upon an insulated base 25. The coils of these electromagnets are connected respectively to a conductor 26, connected to the lamps 15, and to a conductor 27, connected to the lamps 16. The other ends of the coils are connected respectively to contacts 28 and 29, and also to the ends of the respective cores.

A pair of spring pressed manually operable switches 30 and 31, are located upon the front face of the switch box 14, within easy reach of the driver of the vehicle, and are selectively operable to connect the contacts 28 or 29, with a wire 32, which connects the manual switch 21, to the armature 22. A pair of pilot lights 33 and 34, are mounted on the switch box and are connected respectively to the wires 26 and 27.

The operation of the above described mechanism is as follows:—Assuming that the driver of the vehicle intends to turn to the right at the next street intersection, he will depress the switch 31, momentarily, and thus establish contact with the contact 29. Current will then flow from the battery 19, through the switches 18 and 21, wire 32, contacts 29, the coil of magnet 23, wire 26, and lamps 15. The lamps will thereupon become lighted and will indicate to an observer the intention of the driver to turn to the right.

The passage of current through the electromagnet 23, magnetizes the core thereof, which attracts the pivoted armature 22, thereby closing a secondary circuit through the battery 19, the switches 18 and 21, armature 22, the core and coil of electromagnet 23, wire 26, and lamps 15. The pilot light 34, will be simultaneously lighted and will indicate to the driver which of the two sets of lamps 15 and 16, are in operation.

It will be clear that the circuit closing upon depression of the switch 31, is in operation only momentarily, that is, so long as the switch remains manually depressed, the spring associated with the switch operating to break such initial circuit. This break occurs however, only after the armature 22, has been attracted to the core, of the electromagnet, thereby establishing the secondary circuit which remains in operation until it is broken through the medium of steering apparatus or manually.

The breaking of the secondary circuit to extinguish the signal lamps is effected automatically by the arm 13, to which the switch 18, is connected upon operation of the steering wheel when the turn is negotiated. It will be clear that the switch 18, will be opened when the steering mechanism is operated to turn the vehicle either to the right or to the left.

When it is desired to indicate by means of the signal lamps that a turn to the left is to be made, a switch 30 is operated, which in a manner similar to that above described closes the circuit through the coil of the electromagnet 24, whose core then attracts the armature thereto, thereby establishing a secondary circuit, which keeps the lamps 16, burning until the switch 18, has opened upon operation of the steering wheel.

The switch 21, may be manually operated to break the circuit through either of the electromagnets, to extinguish signal lamps should the operator for any reason change his mind about turning the vehicle after having set such lamps into operation.

Figure 3:
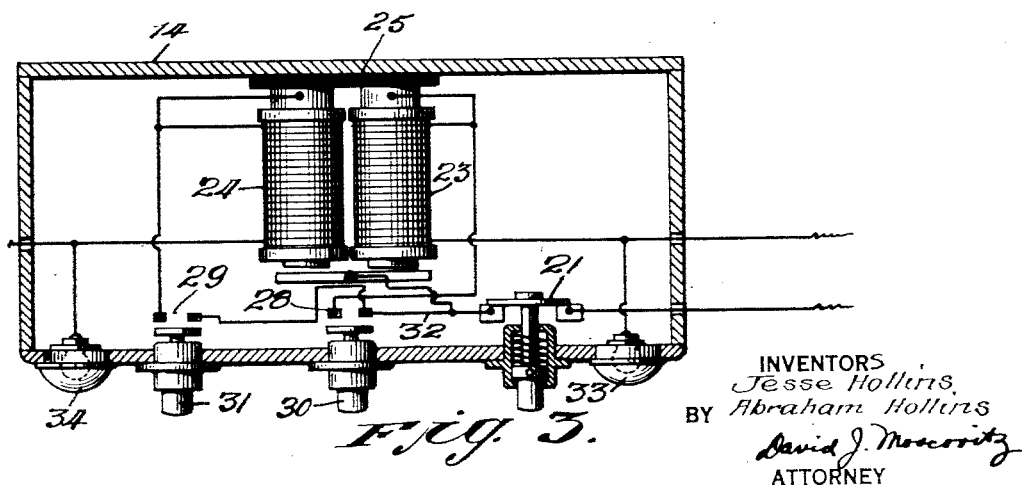
Figure 3 is a horizontal section, through a switch box located on the dash board or steering post of the vehicle, and illustrating the manually operated and the electro-magnetic switches.

As shown in Figure 3, the several elements forming the main part of our mechanism may be positioned within or upon the casing 14, which can be conveniently positioned upon the dash board. If desired, the box may be clamped to the steering post below the steering wheel, or else, the switches 30 and 31, may be positioned upon or under the steering wheel.

Other variations may be resorted to within the scope of the appended claims without departing from the spirit of the invention.

We claim:

1. A signaling system for motor vehicles comprising pairs of electroresponsive signals disposed one pair on each side of the vehicle and adapted to be selectively operated to indicate a contemplated change in directional movement of said vehicle, a battery, a circuit for each pair of signals including an electromagnetic switch, said switches comprising a pair of cores parallel with each other in series with the respective coils carried thereby and with the respective signals associated therewith, an armature pivoted adjacent and between the free extremities of said cores electrically in series with said battery and adapted selectively to engage with said cores, contact terminals leading from said coils, a switch for each circuit adapted when closed to cause said armature to engage with the core included in the circuit of said switch, means operable to break the circuit so closed when a contemplated turn by the vehicle is completed, and means for manually breaking the operating circuit at will.

2. The combination with a pair electroresponsive signals and separate circuits therefor, a casing, a pair of coils in said casing each connected with one of said circuits and having their cores disposed adjacent to and parallel with each other, an armature pivoted intermediate its ends between said coils and having its ends disposed adjacent the ends of said cores, the said armature included in both of said circuits, a normally open switch in each of said circuits, a push button on said casing for each of said switches, and a normally closed push button switch in said casing common to both of said circuits.

JESSE HOLLINS.
ABRAHAM HOLLINS.